United States Patent
Na et al.

(10) Patent No.: US 9,028,157 B2
(45) Date of Patent: May 12, 2015

(54) EFFICIENT BACKSIDE-EMITTING/COLLECTING GRATING COUPLER

(75) Inventors: Yun-chung Na, Palo Alto, CA (US); Haisheng Rong, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,377

(22) PCT Filed: Dec. 15, 2011

(86) PCT No.: PCT/US2011/065271
§ 371 (c)(1),
(2), (4) Date: Jun. 26, 2013

(87) PCT Pub. No.: WO2013/089755
PCT Pub. Date: Jun. 20, 2013

(65) Prior Publication Data
US 2013/0279844 A1    Oct. 24, 2013

(51) Int. Cl.
| G02B 6/36 | (2006.01) |
| G02B 6/34 | (2006.01) |
| G02B 6/12 | (2006.01) |
| G02B 6/122 | (2006.01) |
| G02B 6/124 | (2006.01) |
| G02B 6/132 | (2006.01) |

(Continued)

(52) U.S. Cl.
CPC . *G02B 6/12* (2013.01); *G02B 6/136* (2013.01); *G02B 6/4204* (2013.01); *G02B 6/4214* (2013.01); *G02B 6/1228* (2013.01); *G02B 6/124* (2013.01); *G02B 6/132* (2013.01)

(58) Field of Classification Search
CPC .................................. G02B 6/12; G02B 6/124
See application file for complete search history.

(56) References Cited

U.S. PATENT DOCUMENTS 7,298,941 B2 * 11/2007 Palen et al. ..................... 385/33
7,627,018 B1    12/2009 Guilfoyle et al.

(Continued)

FOREIGN PATENT DOCUMENTS

| JP | 2008-294226 | 4/2008 |
| TW | 2006-36312 | 10/2006 |

OTHER PUBLICATIONS

International Search Report mailed Jun. 29, 2012 for PCT/US2011/065271, filed Dec. 15, 2011, 3 pages.

(Continued)

*Primary Examiner* — Omar R Rojas
(74) *Attorney, Agent, or Firm* — Blakely, Sokoloff, Taylor & Zafman LLP

(57) ABSTRACT

Photonic integrated circuit (PIC) chips with backside vertical optical coupler and packaging into an optical transmitter/receiver. A grating-based backside vertical optical coupler functions to couple light to/from a plane in the PIC chip defined by thin film layers through a bulk thickness of the PIC chip substrate to emit/collect via a backside surface of the PIC chip where it is to be coupled by an off-chip component, such as an optical fiber. Embodiments of a grating-based backside vertical optical coupler include a grating coupler with a grating formed in a topside surface of the thin film A reflector is disposed over the grating coupler to reflect light emitted from the grating coupler through the substrate to emit from the backside of the PIC chip or to reflect light collected from the backside of the PIC chip through the substrate and to the grating coupler.

11 Claims, 7 Drawing Sheets

(51) Int. Cl.
　　　*G02B 6/136*　　　(2006.01)
　　　*G02B 6/42*　　　(2006.01)

(56) References Cited

U.S. PATENT DOCUMENTS

| | | | |
|---|---|---|---|
| 8,267,583 B2 * | 9/2012 | Yao et al. | 384/31 |
| 8,625,942 B2 | 1/2014 | Na et al. | |
| 2008/0253423 A1 | 10/2008 | Kopp | |
| 2010/0111473 A1 * | 5/2010 | Pinguet et al. | 385/37 |
| 2011/0038588 A1 | 2/2011 | Kim et al. | |
| 2011/0091157 A1 | 4/2011 | Yao et al. | |

OTHER PUBLICATIONS

Written Opinion of the International Searching Authority mailed Jun. 29, 2012 for PCT/US2011/065271, filed Dec. 15, 2011, 4 pages.

PCT International Preliminary Report on Patentability for PCT/US2011/065271, mailed Jun. 26, 2014 (6 pgs).

PCT International Preliminary Report on Patentability for PCT/US2011/065271, mailed Jun. 26, 2014 (6 pages).

Taiwan Patent Application No. 101145433, Office Action and Taiwan IPO Search Report (with English translation), dated Sep. 5, 2014, (17 pages).

* cited by examiner

EFFICIENT BACKSIDE-EMITTING/COLLECTING GRATING COUPLER

RELATED APPLICATION

This patent application is a U.S. National Phase Application under 35 U.S.C. §371 of International Application No. PCT/US2011/065271, filed Dec. 15, 2011, entitled AN EFFICIENT BACKSIDE-EMITTING/COLLECTING GRATING COUPLER.

TECHNICAL FIELD

Embodiments of the invention are generally related to photonic integrated circuits (PICs), and more particularly pertain to optical couplers for backside vertical light emission and collection.

BACKGROUND

Monolithically integrated photonic circuits are useful as optical data links in applications such as, but not limited to, optical communications, high performance computing and data centers. For mobile computing platforms too, a PIC is a useful means of I/O to rapidly update or sync a mobile device with a host device and/or cloud service where a wireless link has insufficient bandwidth. Such optical links utilize an optical I/O interface that includes an optical transmitter and an optical receiver. One challenge with the optical I/O interface is coupling light between monolithically integrated photonic circuits, which are fabricated on a micrometer scale, and separately packaged components (e.g., optical fiber, etc.) which are assembled on the millimeter scale. A PIC may utilize vertical or edge-based optical I/O coupling techniques. The edge coupling technologies have a substantial drawback in that device testing requires an edge to be provided, typically by singulating the substrate upon which the PIC was fabricated into individual PIC chips. The vertical coupling technologies, while advantageously amenable to "wafer-level" PIC testing, typically have lower coupling efficiency than do the edge technologies. For example, a surface coupled PIC may have an emission efficiency in the range of about 50%.

Another limitation with vertical coupling techniques is that the presence of optical I/O on a top side of the PIC is generally incompatible with advanced flip-chip or controlled collapse (C4) packaging techniques in which the top side of an IC is affixed to a package substrate (e.g., by bumps and solder balls). For such flip-chip techniques, it is difficult to provide a package substrate that doesn't occlude the vertical optical coupling.

As such, a vertical coupling technique that offers improved coupling efficiency and is amendable to flip-chip packaging would be highly advantageous in the provision of PICs, such as optical transmitters.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Figure 1:
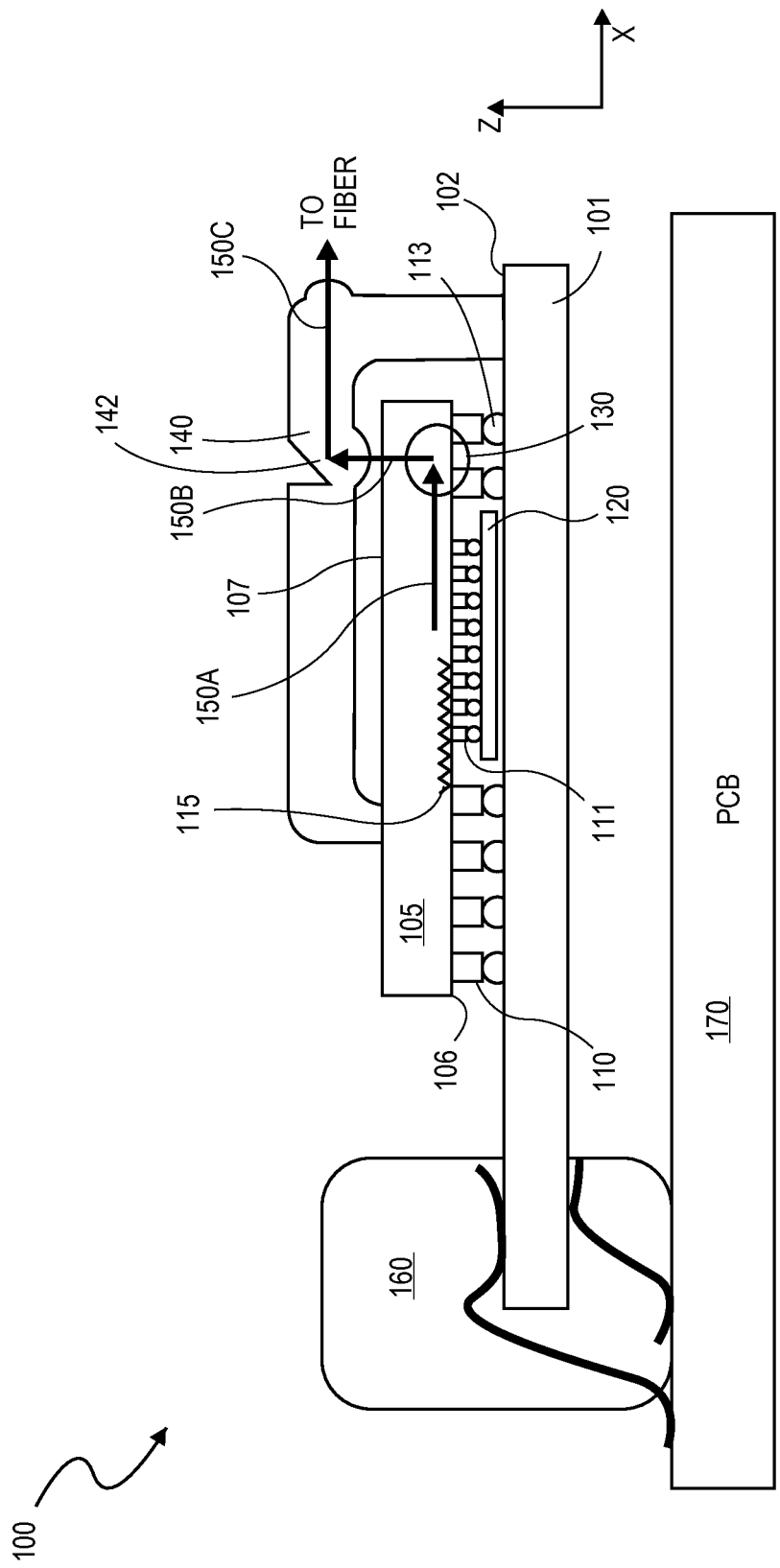
FIG. 1 is an illustration of a cross-section through an optical transmitter, in accordance with embodiments of the present invention.

In the following description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" my be used to indicated that two or more elements are in either direct or indirect (with other intervening elements between them) physical, optical, or electrical contact with each other, and/or that the two or more elements co-operate or interact with each other (e.g., as in a cause an effect relationship).

The terms "over," "under," "between," and "on" as used herein refer to a relative position of one component or material layer with respect to other components or layers where such physical relationships are noteworthy. For example in the context of material layers, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similar distinctions are to be made in the context of component assemblies.

Described herein are architectures for PIC chips, particularly optical transmitters, that include a backside vertical optical coupler. In the exemplary optical transmitter, the backside vertical optical coupler functions to couple light from a plane in the PIC chip defined by thin film layers and through a bulk thickness of the PIC chip substrate to emit from a backside surface of the PIC chip where it is to be collected by an off-chip component, such as a wire terminal. It should also be noted, that while a detailed description of an optical receiver application of the backside vertical optical coupler is omitted for the sake of brevity, one or ordinary skill would be able to apply the backside vertical optical coupler architecture and techniques described herein to achieve a vertical collection of light from a backside surface of the PIC chip. As such, the architectures described in detail herein are applicable to both emission and collection of light for optical transceiver (I/O).

FIG. 1 is an illustration of a cross-section through an optical transmitter 100, in accordance with embodiments of the present invention. The optical transmitter 100 includes a PIC chip 105 flip-chip bonded to a package substrate 101. Embodiments of the present invention are not limited with respect to the package substrate 101. For example, in one embodiment the package substrate 101 is an organic substrate (e.g., comprising a core with build-up layers and plated interconnects) and in an alternate embodiment, the package substrate 101 is an interposer which is then to be bonded to a packaging substrate or a printed circuit board (PCB). Likewise, while the package substrate 101 is illustrated as being coupled to the PCB 170 through a high speed electrical connector 160, embodiments of the present invention are not limited in this respect.

As shown in FIG. 1, the PIC chip has a frontside 106 and a backside 107. Flip-chip, also known as controlled collapse (C4) bonding of the PIC chip 105 entails electrically coupling bumps 110 present on the PIC chip frontside 106 to a side 102 of the package substrate 101 (e.g., via solder balls 113) so that the PIC chip frontside 106 faces the package substrate 101. Proximate to the PIC chip frontside 106 (i.e., distal from the backside 107) are thin film layers in which an optical device(s) 115 is fabricated and encapsulated. The optical device(s) 115 includes at least a monolithically integrated optical waveguide and in the exemplary embodiment, where the PIC 105 is an integrated photonic transmitter (Tx), the optical device(s) 115 further includes a laser optically coupled to the waveguide, and may also include at least one modulator (e.g., based on Mach-Zehnder interferometer, ring resonator, etc.) coupled to the waveguide. The PIC chip backside 107 is a major surface (non-edge surface) of the chip that is most distal from the optical device(s) 115.

In the exemplary embodiment, the optical transmitter 100 includes a second IC chip 120 integrated with the PIC chip 105 at the package level. As shown, the second IC chip 120 is bonded to the PIC chip 105 to be disposed between the PIC chip 105 and the package substrate 101. To minimize routing length, the second IC chip 120 may be flip chip bonded to the PIC chip 105 (e.g., with bumps 111) such that the PIC chip frontside 106 faces a frontside of the second IC chip 120. Depending on the embodiment, the second IC chip 120 may serve a number of functions and may generally be any integrated electrical circuit which is not monolithically integrated into the PIC chip 105 but benefits the optical transmitter 100 when directly coupled to the PIC chip 105 as illustrated in FIG. 1. For example, in the exemplary embodiment, the second IC chip 120 is a driver for the optical device(s) 115, such as a driver of a laser and/or a modulator disposed on the PIC chip 105.

As further illustrated in FIG. 1, the optical transmitter 100 further includes a backside emitting vertical coupler in region 130. The backside emitting vertical coupler couples light from the optical device(s) 115, through the bulk thickness of the PIC chip 105 to be emitted from the PIC chip backside 107 where it is collected by lens 140 for further coupling into a downstream component, such as an optical wire. During operation of the optical transmitter 100, a light signal 150A emitted from (e.g., a laser) or contained in (e.g., by an optical waveguide) is predominantly confined to paths which are substantially parallel to the PIC chip frontside 106 (e.g., parallel to the X-axis) until the light signal reaches the region 130, at which point the light signal 150A is coupled into a direction substantially perpendicular to the PIC chip frontside 106 (e.g., parallel to the Z-axis). In embodiments, the light signal 150B passes through a bulk thickness of the PIC chip 105 as confined only by the bulk material (e.g., without a waveguide). In the illustrative example, the lens 140 is integrated with a 45° mirror 142 to redirect light signal 150B back to a path substantially parallel to the PIC chip topside frontside 106 (e.g., parallel to the X-axis) for coupling to a wire terminal. In alternate embodiments however, any manner of beam collection, conditioning and steering known in the art may be adapted to the light signal 150B as emitted from the PIC chip backside 107.

Generally, the backside emitting vertical coupler 130 may take a number of structural forms. For example, in one embodiment the backside emitting vertical coupler 130 is a 45° mirror (analogous to the mirror 142) formed in a thin film layer of the PIC chip 105, such as a silicon nitride layer. In the exemplary embodiment however, backside emitting vertical coupler is based on an optical grating. Optical gratings offer some manufacturing advantages over a 45° mirror as grayscale lithography or other commonly employed techniques for sloping features is difficult and/or expensive. In particular embodiments described herein however, grating-based vertical couplers offer a further advantage of lower loss, lower back reflection, and lower numerical aperture (NA) than 45° mirror embodiments.

Figure 2A:
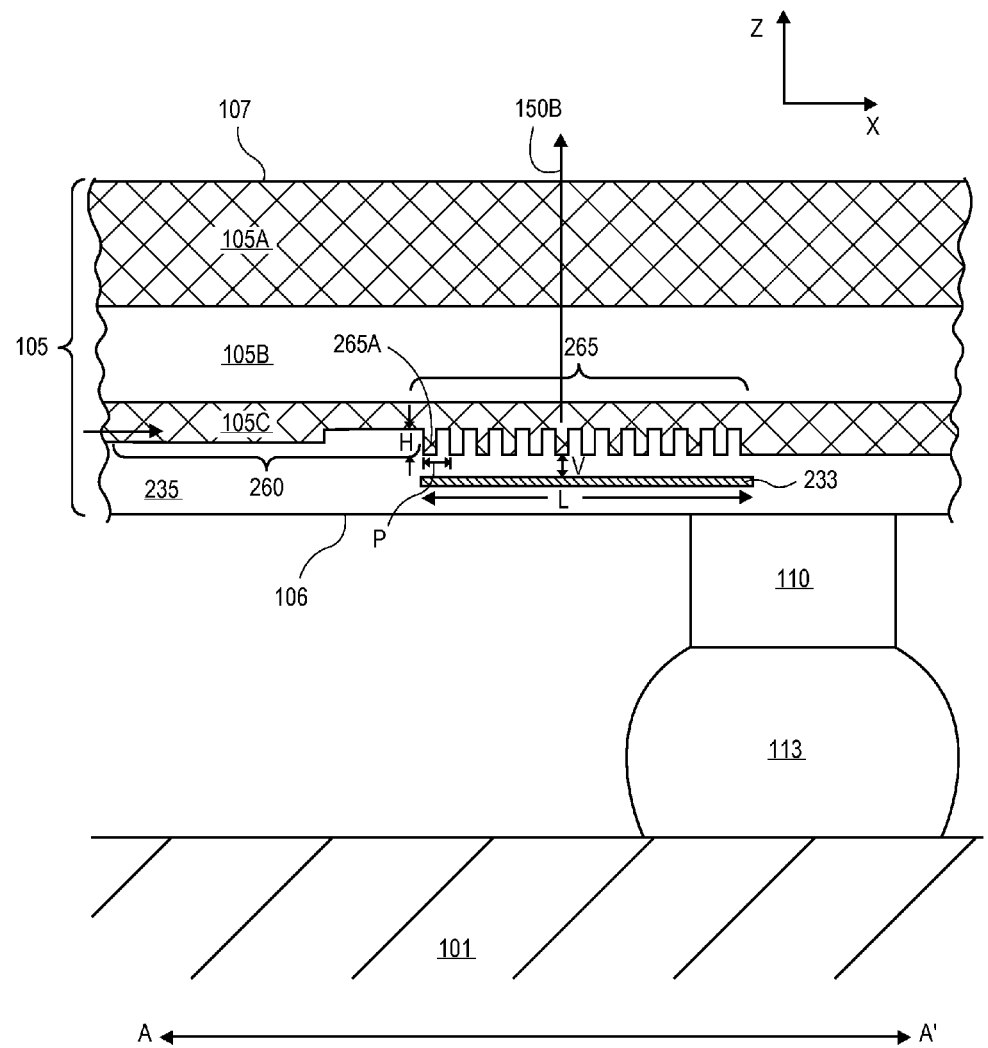
FIG. 2A is an illustration showing an expanded view of a cross-section through the vertical coupler section of an optical transmitter, in accordance with embodiments of the present invention.

FIG. 2A is an illustration showing an expanded view of the optical transmitter 100 along a cross-sectional plane A-A', in accordance with embodiments of the present invention. In one embodiment, the PIC chip 105 includes a silicon substrate. Silicon-based photonic ICs advantageously integrate well with conventional semiconductor fabrication techniques that have been developed for fabrication of CMOS electrical integrated circuits. A silicon substrate may be either bulk crystalline silicon or a silicon-on-insulator (SOI) substrate. In the exemplary embodiment illustrated in FIG. 2A, the PIC chip 105 includes a bulk single crystalline silicon support substrate 105A, a single crystalline silicon device layer 105C, and an intervening insulator layer 105B (e.g., buried silicon dioxide layer). While thicknesses (in the z-dimension) of the various layers in an SOI substrate may vary, the device layer 105C and insulator layer 105B are considered thin films relative to the support substrate 105A. In the exemplary embodiment, the support substrate 105A is between approximately 100 and 800 µm thick while the insulator layer 105B is approximately 1 µm thick, and the device layer 105C is approximately 400 nm thick.

As depicted in FIG. 2A, at least the silicon device layer 105C is fabricated into a waveguide 260 that conducts the light signal 150A parallel to the PIC chip frontside 106 (i.e., along x-dimension) during chip operation. The waveguide 260 may take many forms, such as rib and/or slab, as known in the art. As further illustrated in FIG. 2A, the waveguide 260 is optically coupled to a grating coupler 265. The grating coupler 265 is generally a waveguide that comprises a grating lines 265A formed into a top surface of the waveguide. The grating lines 265A have a grating period P and a height H and extending along the longitudinal axis of the grating coupler (e.g., x-dimension in FIG. 2). Notably, the grating lines 265A are proximate the PIC chip frontside 106, facing a mirror or reflector 233 disposed between the grating coupler 265 and the PIC chip frontside 106 to be between the optical grating coupler 265 and the package substrate 101, when the PIC chip 105 is flip-chip bonded.

Returning to FIG. 2A, during operation, a fraction of the light within the grating coupler 265 is scattered towards the PIC chip backside 107 while the rest of the optical power is emitted toward the reflector 233. For grating lines 265A having a certain grating pitch and duty cycle (line:space ratio), a reflector 233 of sufficiently high reflectivity and properly spaced from the grating line by spacing V, reflects the topside directed optical emission to constructively interfere with the scattered light leaked from the grating coupler 265 and constitute the light signal 150B which is propagated through the bulk substrate 105A and emitted from the PIC chip backside 107. With this vertical coupling architecture, very high efficiency (e.g., greater than 90%) can be achieved.

Of course, in the context of an optical receiver, the grating coupler 265 may also serve to collect light from the PIC chip backside 107. In this mode of operation, the reflector 233 then reflects a bottomside directed optical emission to the grating coupler 265 which is then propagated through the waveguide 260.

Figure 2B:
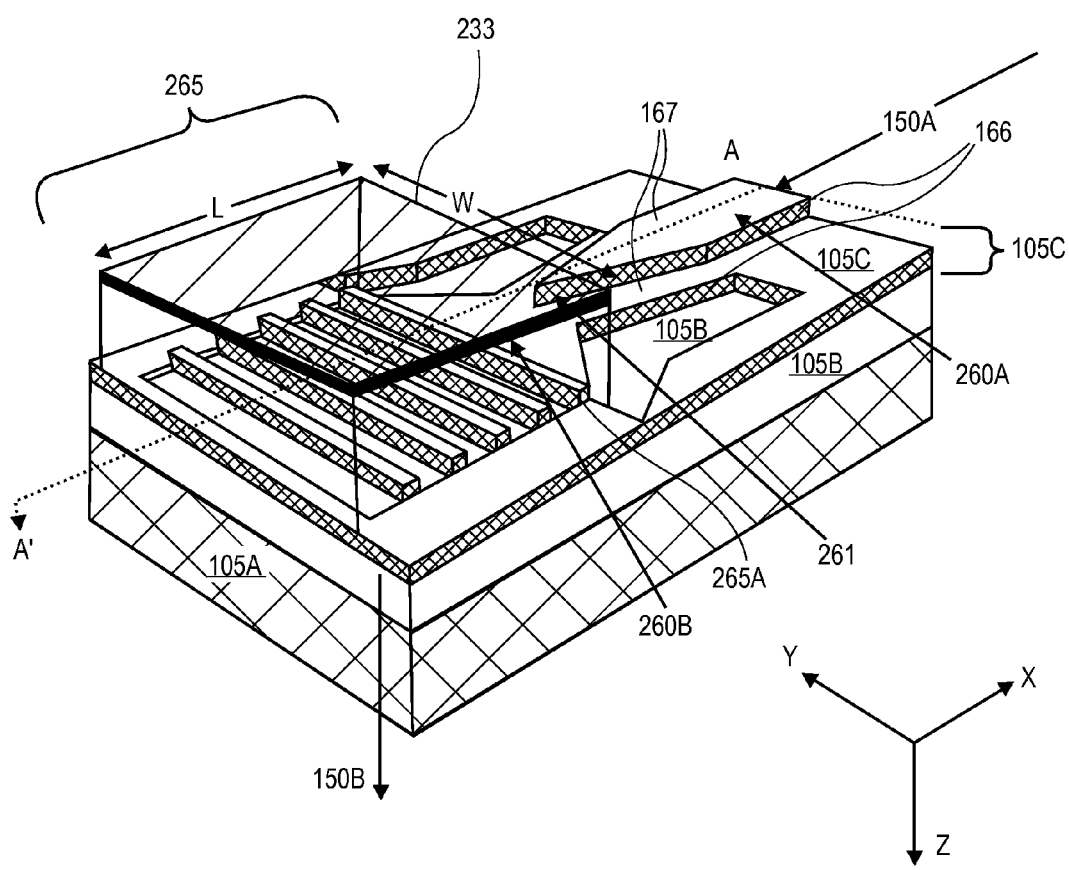
FIG. 2B is an isometric view of the optical transmitter illustrated in FIG. 2A.

FIG. 2B is an isometric view of an architecture for coupling light in a waveguide to a backside vertical emitting grating coupler, in accordance with an embodiment. The A-A' plane illustrated of FIG. 2A is illustrated as a dashed line A-A' in FIG. 2B with the PIC chip 105 oriented as it would during fabrication of the grating coupler 265 with the axis legend reoriented from FIG. 2A accordingly. As shown, light signal 150A is first carried by a rib waveguide 260A, a taper 261 then couples the light through a slab waveguide 260B that is adiabatically coupled into the grating coupler 265. As illustrated, the waveguide 260, (rib 260A or slab 260B) includes opposing sidewalls 166 that are nominally vertical (i.e., with 5° of the z-axis) with a top surface 167 disposed there between. In the grating coupler 265, the grating line height (e.g. H in FIG. 2A) is such that a top surface of the grating lines are coplanar with a top surface of the rib waveguide 260A and therefore extend above the top surface of the region beyond the ends of the grating lines 265A. Thus, relative to the surrounding regions, the grating lines 265A are well-described as fins. The grating lines 265A extend in the y-dimension across a top surface of the grating coupler with spaces between the grating lines recessed to define a recessed top grating coupler surface which is below the top surface of the region beyond the ends of the grating lines 265A. Opposing sidewalls of the optical grating coupler therefore entail both opposing ends of the grating lines 265A and adjacent ends of trenches between the lines. As further shown in FIG. 2B, where the slab waveguide 260A is defined by sidewalls 166 that extend to the insulator layer 105B, recesses or trenches corresponding to spaces between the grating lines 265A do not perforate the device layer 105C to expose the insulator layer 105B.

In the exemplary embodiment, the taper 261 entails a reduction in the y-dimension of the rib waveguide 260A. In other embodiments however, the taper 261 may include a taper in the z-dimension in the alternate, or in combination with the y-dimension taper. It should be noted that while the structures illustrated in FIG. 2B efficiently couple the light signal 150A into the grating coupler 265, other designs may be utilized without departing from the spirit of the backside vertical emission grating couplers described herein.

As shown in FIG. 2B, the reflector 233 is dimensioned to occupy at least the area of the grating coupler 265 with the reflector 233 disposed in substantial alignment with the grating coupler 265 in the vertical (z) dimension. Smaller reflector dimensions or misaligned reflectors will generally disadvantageously reduce emission efficiency. Thus, in the exemplary embodiment shown in FIGS. 2A and 2B, the reflector 233 has a length L that is at least equal to the longitudinal length of the grating coupler (i.e., reflector 233 extends over all grating lines 265A and spaces there between) and the reflector width W is similarly at least equal to the transverse llength of the grating lines 265A (y-dimension).

Generally, the reflector 233 is to have a high reflectivity over the wavelengths of interest. Embodiments employing a metal thin film for the reflector 233 advantageously offer high reflection over a wide spectral bandwidth. In embodiments, the reflector 233 is a thin film of metal such as aluminum with aluminum embodiments offering the advantage of greater compatibility with silicon CMOS-type fabrication constraints while offering a higher reflectivity than that of other metals such as copper, titanium, or the like frequently utilized as interconnect metals in CMOS ICs. The thickness of the thin film metal need only be a few tens of nanometers (e.g., 10-20 nm), but in the exemplary embodiment is greater than 100 nm for sake of controlling the process utilized for forming of the reflector 233. In other embodiments, the reflector 233 may comprises a stack of dielectric materials of alternating high and low refractive index (i.e., a H-L index stack).

As illustrated in FIG. 2A, disposed over the waveguide 260 and between the grating coupler 265 and the reflector 233 is an interlayer dielectric (ILD) 235, such as silicon dioxide or other material offering suitable index contrast. Additional ILD may be disposed over the reflector 233 encapsulating the reflector 233, augmenting the thickness of the dielectric waveguide cladding, etc. As such, because the grating lines 265A can be fabricated using known techniques and formation of the reflector 233 is straightforward as it is disposed over the grating lines 265A (i.e., formed after the grating lines 265A are etched rather than as a buried layer), the backside emitting vertical grating coupler embodiments described herein are highly manufacturable.

Figure 3A:
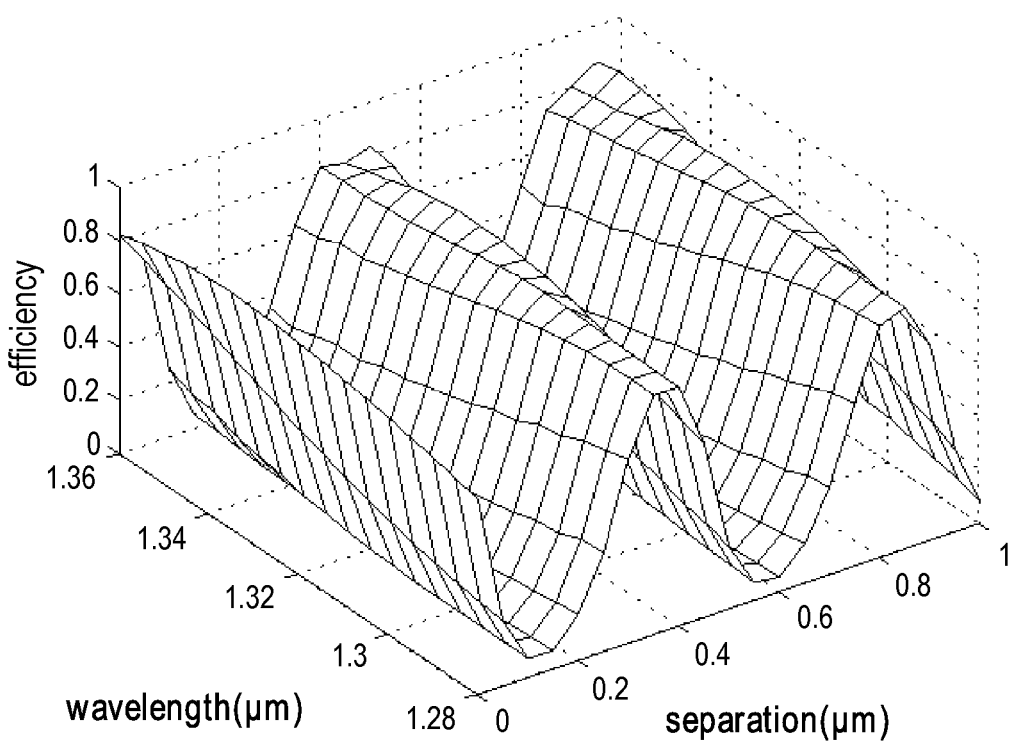
FIG. 3A is a plot illustrating the emission efficiencies of a grating-based backside emitting vertical coupler in accordance with embodiments of the present invention.
Figure 3B:
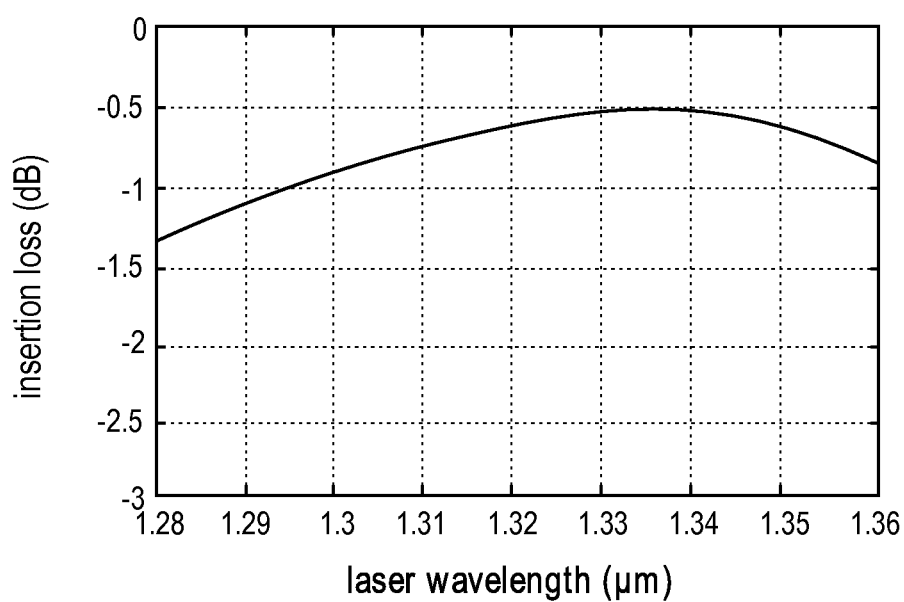
FIG. 3B is a plot illustrating insertion loss of a backside emitting vertical coupler as a function of wavelength in accordance with embodiments of the present invention.

FIG. 3A is a plot illustrating the emission efficiencies of a backside emitting vertical coupler as a function of wavelength ($\lambda$) and the spacing V between the reflector 233 and grating line 265A in accordance with embodiments of the present invention. FIG. 3B is a plot illustrating insertion loss of a backside emitting vertical coupler as a function of free space wavelength for V=0 in accordance with embodiments of the present invention. For FIGS. 3A and 3B, the backside vertical grating coupler having the architecture illustrated in FIGS. 2A and 2B is implemented with a grating period P of approximately 500 nm, a grating duty cycle of approximately 70% and a grating height H of approximately 220 nm for a 400 nm thick silicon device layer 105C. For these parameters in the exemplary SOI substrate, the light signal 150B is emitted as a beam in substrate 105A with an effective numerical aperture (NA) of approximately 0.1 and an emission angle of less than 5° in silicon substrate.

As shown in FIG. 3A, backside emission efficiency is as high as ~91.4% as a function of wavelength ($\lambda$) and the spacing V between the reflector 233 and grating line 265A. As illustrated, because aluminum reflector embodiments have broadband low-loss reflection, embodiments described herein have a large bandwidth (e.g., >80 nm at 1 dB full-width) making the architectures suitable for multi-wavelength systems such as wavelength division multiplexing (WDM) optical links The dependency on the spacing V is due to the optical interference between light leaked toward the PIC chip backside 107 and that reflected toward the PIC chip backside 107 by the reflector 233. However, as shown in FIG. 3A, this dependency in spacing V is relatively weak with efficiency being over 85% for a 0.1 µm (100 nm) range, which can be easily achieved as the spacing V may be defined by a thin film deposition (e.g., by a silicon dioxide CVD) process. For example, at a wavelength of 1.3 µm, 91% efficiency occurs at a spacing V of 0.4 µm and is not significantly reduced until V is greater than approximately 0.44 µm or is less than approximately 0.34.

As shown in FIG. 3B, an embodiment of the backside emitting grating coupler where the spacing V is 0 (i.e., an aluminum reflector 233 is disposed directly on the grating lines 265A) illustrated insertion loss to be as low at 0.5 dB at a spectral peak. As such, the backside emitting vertical grating coupler embodiments described herein offer high emission efficiency.

Figure 4:
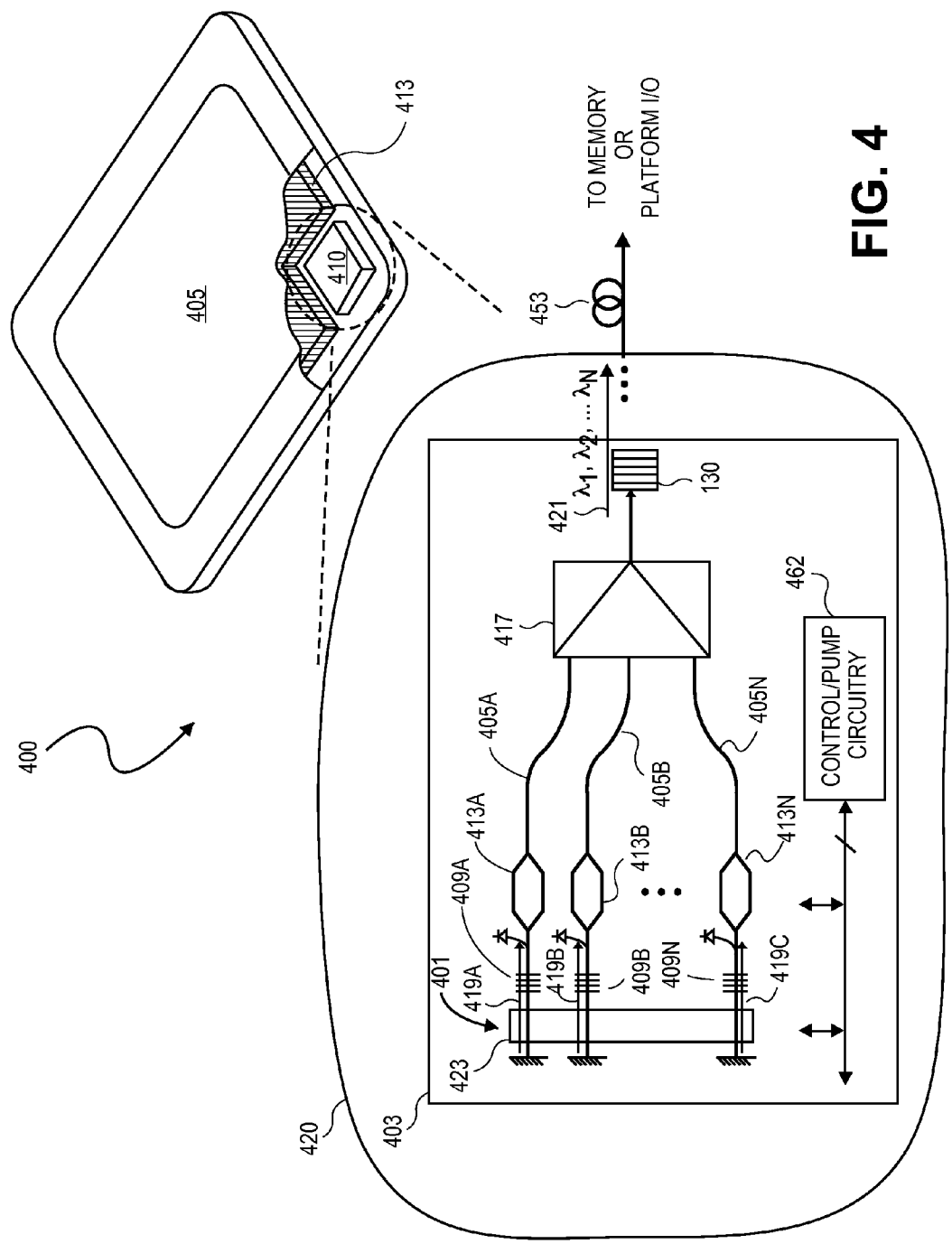
FIG. 4 is a schematic diagram of a mobile device including an optical transmitter, in accordance with embodiments of the present invention.

While the optical transmitter 100 including a backside emitting vertical grating coupler described herein may be utilized in many system-level applications, FIG. 4 is a schematic diagram of a mobile computing platform including an optical transmitter in accordance with embodiments of the present invention. The mobile computing platform 400 may be any portable device configured for each of electronic data display, electronic data processing, and wireless electronic data transmission. For example, mobile computing platform 400 may be any of a laptop, a netbook, a notebook, an ultrabook, a tablet, a smart phone, etc. and includes a display screen 402, which may be a touchscreen (e.g., capacitive, resistive, etc.) the optical transmitter 410, and a battery 413.

The optical transmitter 410 is further illustrated in the expanded functional block view 420 illustrating an array of electrically pumped lasers 401 controlled by circuitry 462 coupled to a passive semiconductor layer over, on, or in, substrate 403. The semiconductor substrate 403 further includes a plurality of optical waveguides 405A-405N over which a bar of gain medium material 423 is bonded to create, along with the reflectors 409A-409N, an array of lasers that during operation generate a plurality of optical beams 419A-419N in the plurality of optical waveguides 405A-405N, respectively. The plurality of optical beams 419A-419N are modulated by modulators 413A-413N and then selected wavelengths of the plurality of optical beams 419A-419N are then combined with optical multiplexer 417 to output a single optical beam 421, which is then to be optically coupled through the backside emitting vertical coupler 130, for example using a grating-based backside emitting vertical coupler substantially as describe elsewhere herein, and into an optical wire 453. The optical wire 453 is further coupled to a downstream optical receiver external to the mobile computing platform 400 (i.e., coupled through the platform optical I/O terminal) or is further coupled to a downstream optical receiver internal to the mobile computing platform 400 (i.e., a memory module).

In one embodiment, the grating-based backside emitting vertical coupler is capable of transmitting data at the multiple wavelengths included in the optical beam 421 over the single optical wire 453 at speeds of at least 25 Gb/s and potentially more than 1 Tb/s. In one example, the plurality of optical waveguides 405A-405N are spaced approximately 50-100 µm apart in a single silicon layer for an entire bus of optical data occupying a PIC chip of less than 4 mm on a side.

Figure 5:
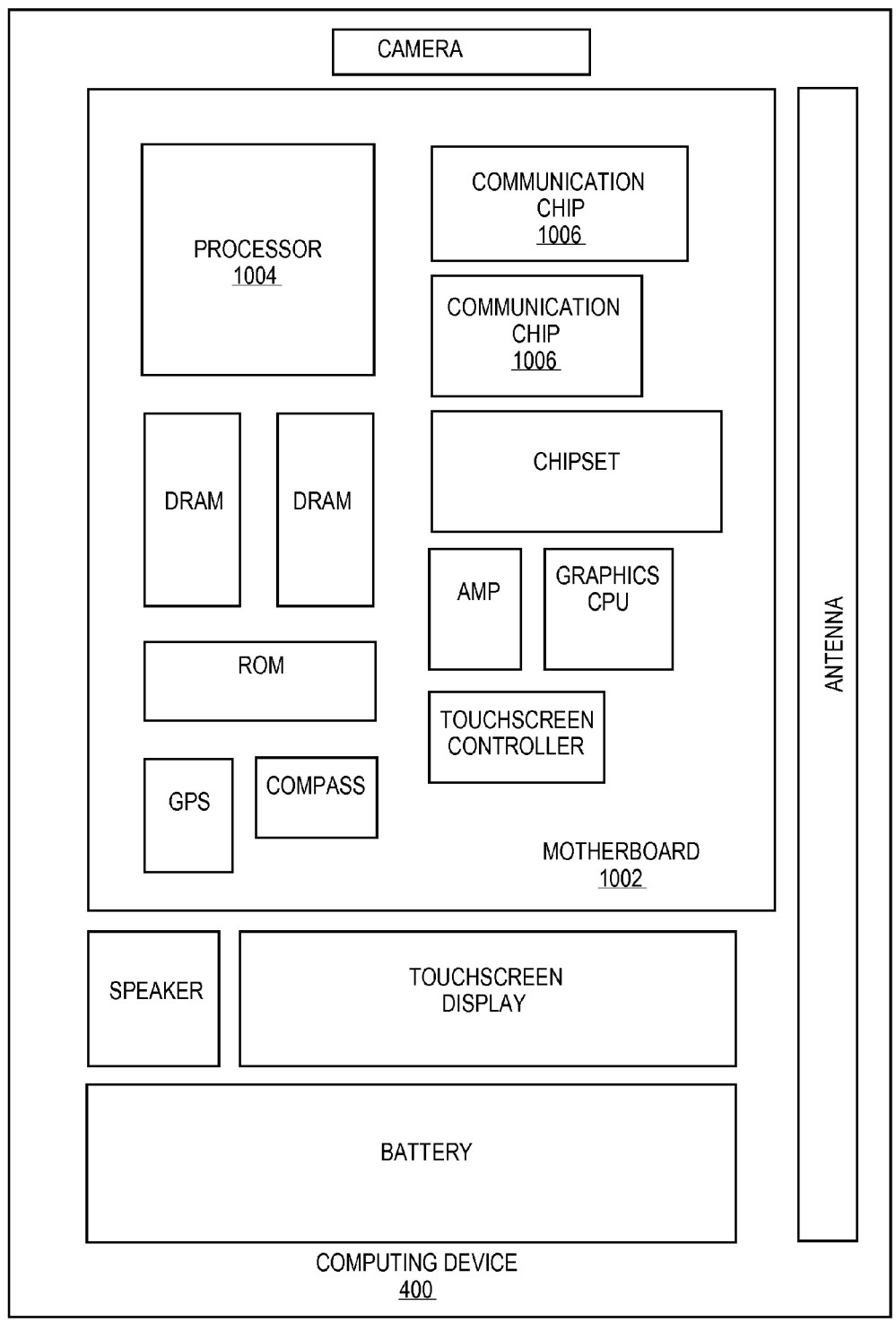
FIG. 5 is a function block diagram of the mobile device illustrated in FIG. 4, in accordance with an embodiment of the present invention.

FIG. 5 is a functional block diagram of the mobile computing platform 400 in accordance with one embodiment of the invention. The mobile computing platform 400 includes a board 1002. The board 1002 may include a number of components, including but not limited to a processor 1004 and at least one communication chip 1006. The processor 1004 is physically and electrically coupled to the board 1002. In some implementations the at least one communication chip 1006 is also physically and electrically coupled to the board 1002. In further implementations, the communication chip 1006 is part of the processor 1004. Depending on its applications, mobile computing platform 400 may include other components that may or may not be physically and electrically coupled to the board 1002. These other components include, but are not limited to, volatile memory (e.g., DRAM), non-volatile memory (e.g., ROM), flash memory, a graphics processor, a digital signal processor, a crypto processor, a chipset, an antenna, touchscreen display, touchscreen controller, battery, audio codec, video codec, power amplifier, global positioning system (GPS) device, compass, accelerometer, gyroscope, speaker, camera, and mass storage device (such as hard disk drive, solid state drive (SSD), compact disk (CD), digital versatile disk (DVD), and so forth).

At least one of the communication chips 1006 enables wireless communications for the transfer of data to and from the mobile computing platform 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The mobile computing platform 400 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 includes an integrated circuit die packaged within the processor 1004. The term "processor" may refer to any device or portion of a device that processes electronic data from registers and/or memory to transform that electronic data into other electronic data that may be stored in registers and/or memory. Either of the communications chip 1006 may entail the optical transmitter 100, substantially as described elsewhere herein.

Figure 6:
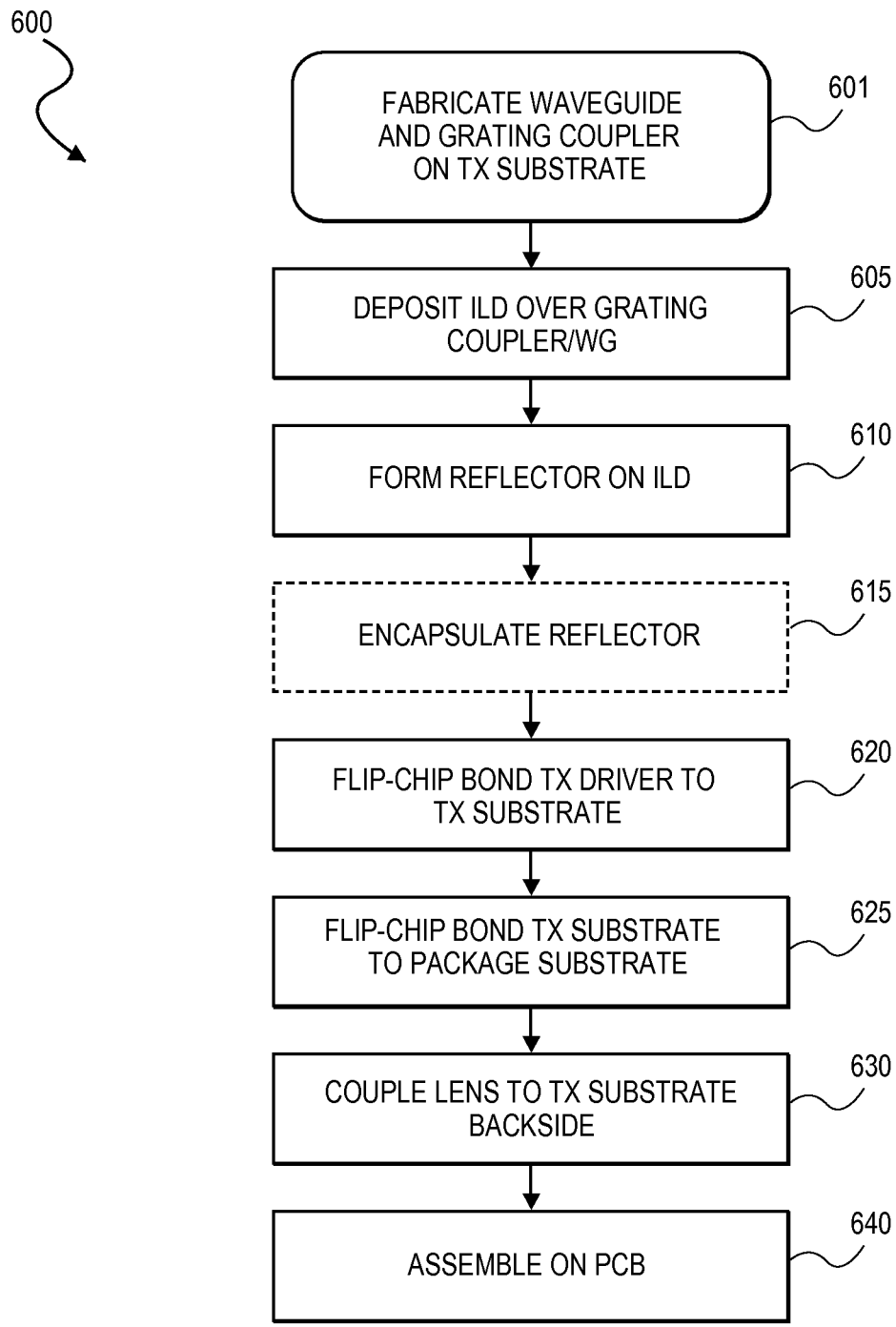
FIG. 6 is a flow diagram illustrating a method of manufacturing an optical transmitter, in accordance with an embodiment of the present invention.

With the device and system-level architectures described, methods for forming the optical transmitter 100 are now described in reference to FIG. 6. The method 600 is illustrated in FIG. 6 by high level operations which may each further include a number of separate processing operations, as known in the art. No order is to be implied by the relative position of the operations in FIG. 6, however an order of operations may be implicit where one operation necessarily operates on the output of another operation.

Method 600 begins at operation 601 with fabrication of a waveguide and grating coupler on a substrate, such as an SOI substrate, as a function region of an optical transmitter PIC chip. Any techniques known in art, such as photolithography and anisotropic silicon plasma etch, etc. may be utilized to form a grating coupler (e.g., the grating coupler 265 illustrated in FIGS. 2A and 2B) and a waveguide (e.g., the waveguide 260 in FIGS. 2A and 2B). For example, a silicon layer of a silicon-on-insulator (SOI) substrate is etched to define horizontal sidewalls and recesses are etched into a top surface of the rib or slab between the horizontal sidewalls.

At operation 605, an ILD is deposited over the grating coupler and waveguide formed in operation 601. For example, in one embodiment a layer of silicon dioxide is deposited with a conventional CVD or plasma enhanced (PE) CVD process.

At operation 610, a reflector (e.g., reflector 233) is formed on the ILD layer deposited at operation 605. In one embodiment, a thin film of metal, such as aluminum, is deposited by physical vapor deposition (PVD), masked in regions aligned with the grating coupler with known photolithography techniques, and etched with conventional plasma or wet chemical techniques. In certain embodiments the metal thin film utilized for the reflector is also utilized for interconnects in the Tx PIC, for example with aluminum traces coupling to ohmic metal contact regions of a laser or modulator portion of the waveguide.

At operation 615, the reflector formed at operation 610 is encapsulated by a ILD layer, such as silicon dioxide deposited with a CVD or PECVD process. Conventional backend processing (e.g., C4-type build up layers and bumping) completes the PIC chip, as known in the art, with top side functional/parametric test of the PIC is also performed prior to PIC chip singulation.

At operation 620, a die-on-die stacking process may be optionally performed to flip-chip bond a driver IC chip to the Tx PIC chip, so that a frontside of the PIC chip faces a frontside of the drive IC chip, (e.g., as illustrated in FIG. 1).

At operation 625, a singulated Tx PIC chip is flip-chip bonded to a package substrate, such as the package substrate 101 illustrated in FIG. 1, using known packaging/soldering techniques so that a frontside of the PIC chip faces the package substrate.

At operation 630 a lens is affixed to align with a region of the Tx PIC chip backside where the grating coupler is to emit a beam from the PIC chip backside. Conventional lens bonding techniques may be utilized to bond the lens (e.g., lens 140) to either the package substrate or directly to the PIC chip.

Method 600 is then completed with operation 640, where the packaged Tx PIC is assembled onto a PCB using any techniques conventional to the art.

It is to be understood that the above description is illustrative, and not restrictive. For example, while flow diagrams in the figures show a particular order of operations performed by certain embodiments of the invention, it should be understood that such order may not be required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. An integrated optical transmitter, comprising:
    a package substrate;
    a photonic integrated circuit (PIC) chip flip-chip bonded to the package substrate with a optical waveguide and an optical grating-based vertical coupler comprising a plurality of fins disposed in thin film layers on a frontside of the PIC chip facing the package substrate;
    an optical lens to couple light to the vertical coupler through a backside of the PIC chip;
    a first integrated circuit (IC) chip that is flip-chip bonded to the PIC chip and disposed between the PIC chip and the package substrate, wherein the PIC chip comprises a laser coupled to the optical waveguide and wherein the first IC chip comprises a driver electrically coupled to the laser.

2. The optical transmitter of claim 1, wherein the plurality of fins act as
    an optical grating coupler to receive light from the optical waveguide; and wherein
    a reflector is disposed between the optical grating coupler and the package substrate to reflect light emitted from the optical grating coupler toward the backside of the PIC chip.

3. The optical transmitter of claim 1, wherein the plurality of fins
    are formed in a thin film surface that faces the reflector.

4. The optical transmitter of claim 2, wherein the reflector comprises a metal thin film having a surface area facing the optical grating coupler that is at least equal to a chip area occupied by the optical grating coupler.

5. The optical transmitter of claim 4, wherein the metal is selected from the group consisting of aluminum, silver, and gold.

6. The optical transmitter of claim 2, wherein the optical waveguide and optical grating coupler consists essentially of single crystalline silicon and wherein the reflector is spaced apart from the optical grating coupler by an interlayer dielectric (ILD).

7. The optical transmitter of claim 6, wherein the single crystalline silicon is spaced apart from a single crystalline substrate by an insulator layer, and wherein the ILD comprises silicon dioxide.

8. A method of manufacturing an optical transmitter, comprising:
    fabricating a photonic integrated circuit chip attached to a package substrate, the fabricating further comprising:
    forming an optical waveguide and an optical grating coupler comprising a plurality of fins in a thin film disposed on a frontside of a substrate;
    depositing an interlayer dielectric over the optical waveguide and optical grating coupler;
    depositing and patterning a metal thin film to form a reflector aligned over the optical grating coupler; and
    flip-chip bonding a first integrated circuit (IC) chip to the PIC chip, the first integrated circuit (IC) chip disposed between the PIC chip and the package substrate, wherein the PIC chip comprises a laser coupled to the optical waveguide and wherein the first IC chip comprises a driver electrically coupled to the laser.

9. The method of claim 8, wherein forming the optical grating coupler further comprises etching a silicon layer of a silicon-on-insulator (SOI) substrate into a rib or slab having recesses disposed in a top surface between opposing sidewalls, and wherein depositing the metal thin film further comprises depositing aluminum.

10. The method of claim 8, further comprising:
    flip-chip bonding the PIC chip to the package substrate, the frontside of the PIC chip facing the package substrate; and affixing a lens to receive light emitted from a backside of the PIC chip.

11. The method of claim 8, wherein a frontside of the PIC chip faces a frontside of the IC chip, and wherein the reflector is disposed between the optical grating coupler and at least one of the IC chip and the package substrate.

* * * * *

UNITED STATES PATENT AND TRADEMARK OFFICE
CERTIFICATE OF CORRECTION

PATENT NO. : 9,028,157 B2  
APPLICATION NO. : 13/976377  
DATED : May 12, 2015  
INVENTOR(S) : Na et al.

Page 1 of 1

It is certified that error appears in the above-identified patent and that said Letters Patent is hereby corrected as shown below:

In the Specification

Please insert in column 1, line 5 before RELATED APPLICATION:

--STATEMENT OF GOVERNMENT INTEREST

This invention was made with Government support under contract number H98230-10-9-0021 awarded by the Department of Defense. The Government has certain rights in this invention.--

Signed and Sealed this  
Third Day of November, 2015

Michelle K. Lee  
*Director of the United States Patent and Trademark Office*